(12) United States Patent
Madigan

(10) Patent No.: US 7,464,942 B2
(45) Date of Patent: Dec. 16, 2008

(54) SHAFT SEAL HAVING INDEPENDENT SEALING LIPS

(75) Inventor: Christopher Madigan, Brighton, MI (US)

(73) Assignee: Federal-Mogulk World Wide, Inc., Southfield, MI (US)

(*) Notice: Subject to any disclaimer, the term of this patent is extended or adjusted under 35 U.S.C. 154(b) by 44 days.

(21) Appl. No.: 11/153,149

(22) Filed: Jun. 15, 2005

(65) Prior Publication Data

US 2006/0284381 A1    Dec. 21, 2006

(51) Int. Cl.
*F16J 15/32* (2006.01)
*F16J 15/34* (2006.01)

(52) U.S. Cl. .................................................. 277/569

(58) Field of Classification Search ............. 277/549, 277/551, 561, 562, 569, 572–573
See application file for complete search history.

(56) References Cited

U.S. PATENT DOCUMENTS

| | | | |
|---|---|---|---|
| 3,827,703 A | | 8/1974 | Brink |
| 3,913,924 A | * | 10/1975 | Barefoot et al. ............. 277/574 |
| 4,053,166 A | | 10/1977 | Domkowski |
| 4,243,232 A | * | 1/1981 | Repella ...................... 277/568 |
| 4,258,927 A | * | 3/1981 | Cather, Jr. ................... 277/309 |
| 5,129,744 A | * | 7/1992 | Otto et al. .................... 384/486 |
| 5,522,600 A | * | 6/1996 | Duckwall .................... 277/402 |
| 5,649,709 A | | 7/1997 | Munekata et al. |
| 5,713,577 A | | 2/1998 | Lannert et al. |
| 5,874,170 A | | 2/1999 | Heine et al. |
| 6,186,507 B1 | * | 2/2001 | Oldenburg ................... 277/353 |
| 6,428,013 B1 | * | 8/2002 | Johnston et al. ............. 277/400 |
| 6,474,653 B1 | * | 11/2002 | Hintenlang et al. .......... 277/433 |
| 6,601,855 B1 | * | 8/2003 | Clark .......................... 277/549 |
| 6,620,361 B1 | * | 9/2003 | Longtin et al. .............. 264/138 |
| 6,692,007 B2 | | 2/2004 | Oldenburg |
| 6,814,668 B2 | * | 11/2004 | Grupido ...................... 464/133 |
| 6,988,733 B2 | * | 1/2006 | Hatch .......................... 277/571 |
| 2003/0168814 A1 | | 9/2003 | Struyven et al. |
| 2004/0119241 A1 | | 6/2004 | Castleman |

FOREIGN PATENT DOCUMENTS

EP    2 580 767    4/1985

* cited by examiner

*Primary Examiner*—Vishal Patel
(74) *Attorney, Agent, or Firm*—Robert L. Stearns; Dickinson Wright PLLC

(57) ABSTRACT

A shaft seal includes a rigid annular casing to which a body of elastomeric seal material is molded. At least one elastomeric seal lip is formed of the elastomeric material. A PTFE element is bonded to the elastomer material and is formed with an undercut overlying the PTFE element to provide a flex hinge to the PTFE element that is isolated and independent from a hinge of the elastomeric seal lip.

12 Claims, 1 Drawing Sheet

SHAFT SEAL HAVING INDEPENDENT SEALING LIPS

BACKGROUND OF THE INVENTION

1. Technical Field

This invention relates to radially acting dynamic shaft seals, which include a PTFE seal element.

2. Related Art

It is common in shaft seal applications to employ a PTFE seal element. The PTFE element can be secured to a rigid annular casing of the seal assembly either by clamping the element between joined case members, or by bonding the PTFE element to the casing by an intermediate elastomer material such as rubber. It is also known to provide the rubber material with a flex joint to enable the PTFE element to flex and remain in sealing contact with the shaft during conditions of shaft run out where the shaft becomes displaced radially from its true center of rotation.

It is also common to form one or more sealing lips from the elastomer material that may also run in sealing contact with the shaft to enhance sealing performance.

It is an object of the present invention to improve upon such seals, and in particular the flexibility and sensitivity of the PTFE and rubber sealing lips.

SUMMARY OF THE INVENTION

A shaft seal includes a rigid annular casing, an elastomer seal body molded to the casing and defining at least one annular elastomer sealing lip extending radially inwardly of the casing, a PTFE seal element bonded to the elastomer seal body to define a PTFE seal lip in axially spaced relationship to the elastomer seal lip, and wherein the seal body is formed with a flex-enhancing undercut region extending from a radially inner shaft-engaging surface of the elastomer seal lip to a location overlying the PTFE seal lip.

Such a seal construction has the advantage of increasing the flexibility of the PTFE seal lip and enabling it to flex independently of the flexing of the elastomeric seal lip. The undercut region, in effect, isolates the flexing action of PTFE and elastomeric lips so that they act independently of one another.

According to a further preferred feature, a portion of the casing lies axially between the two lips defining a central rigid section of the elastomeric body between the two lips. The two seal lips have associated hinges that lie on opposite sides of the rigid section and thereby are assured to be isolated from one another in their flexing action in use.

Such isolated seal lips enable the manufacturer to precisely control the pressure that the lips exert on the shaft. For example, the PTFE seal lip can be made as an extremely sensitive, low pressure, highly flexible running seal that can easy conform to the shape and any radial movements of the shaft for optimum performance, while the elastomeric lip may be of similar light load as that of the PTFE lip or, if desired, a little stronger or lighter as the case may.

BRIEF DESCRIPTION OF THE DRAWINGS

These and other features and advantages of the present invention will become more readily appreciated when considered in connection with the following detailed description and appended drawings, wherein.

DETAILED DESCRIPTION

Figure 2:
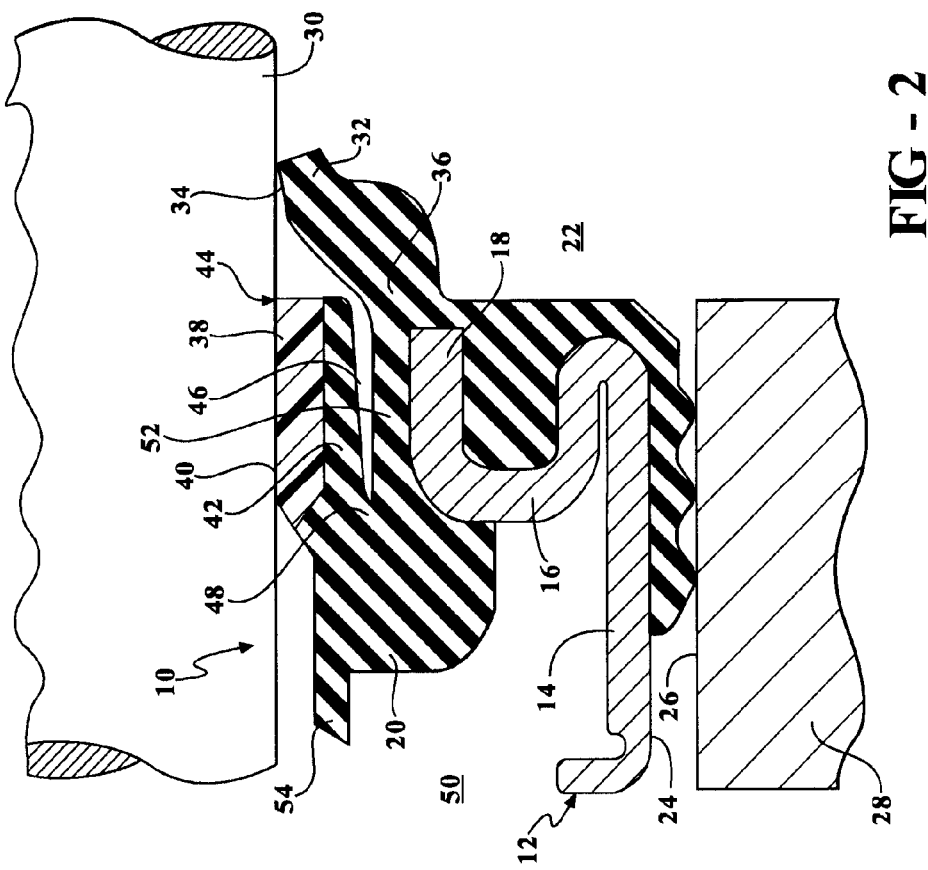
FIG. 2 is a view like FIG. 1, but illustrating the seal in use in sealing a shaft.
Figure 1:
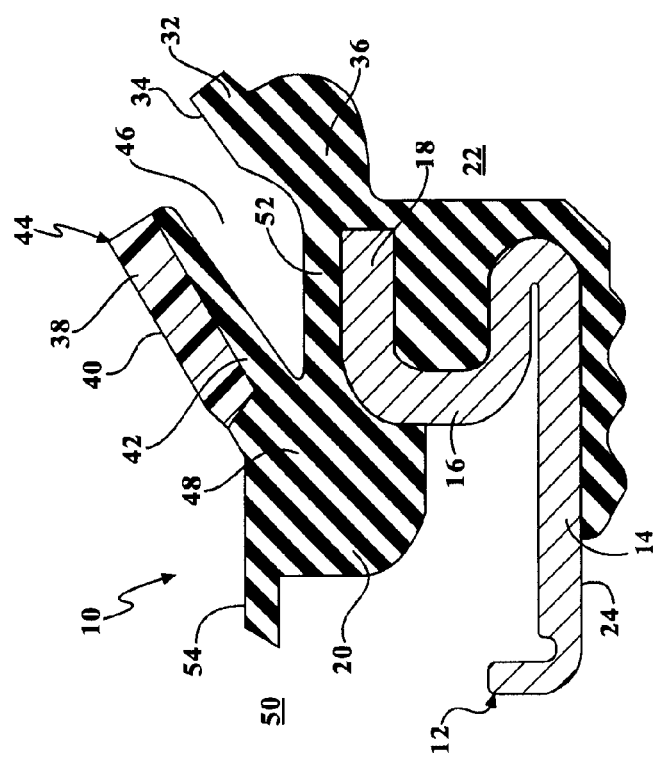
FIG. 1 is cross-sectional view of a seal constructed according to the present invention.

A presently preferred embodiment of a shaft seal assembly according to the invention is shown generally at 10 in the drawings. The seal assembly 10 includes a rigid annular carrier 12 that is preferably fabricated of stamped metal. The carrier 12 includes an axially extending, generally cylindrical mounting portion 14 and a radially inwardly extending flange portion 16. The flange portion 16 terminates at its inner end in an axially extending, generally cylindrical foot portion 18 that extends in the axially opposite direction to that of the mounting portion 14. It will be seen that the flange portion 16, including the foot portion, may have a generally U-shaped cross-sectional configuration.

An elastomeric body 20 of sealing material, and preferably rubber, is molded to the carrier 12. The elastomeric material is molded to the foot portion 18, such that the foot portion 18 is embedded in the elastomer material 20, and extends around an oil side 22 of the flange 16 and across a radially outer surface 24 of the mounting portion. As illustrated in FIG. 2, the carrier is mounted in a bore 26 of housing 28 through which a rotatable shaft 30 extends. The gap between the bore 26 and shaft 30 is to be sealed by the seal assembly 10. The elastomeric seal material 20 on the outer surface 24 provides a seal between the carrier 12 and the wall of the bore 26.

The elastomeric body 20 includes a first elastomeric annular seal lip 32 that extends radially inwardly of the carrier 12. The lip 32 has a radially inner shaft-engaging surface 34 for sealingly engaging the shaft 30. The lip 32 has extends axially away from the oil side 22 of the carrier 12. The lip 32 has a hinge 36 adjacent the foot portion 18 of the carrier 12 on the oil side 22 of the carrier 12. The hinge 36 enables the lip 32 to flex in the radial direction and to conform and move with any radial run-out action of the shaft 30.

An annular PTFE (polytetrafluoroethylene) seal element 38 is bonded to the elastomeric body 20. The PTFE element 38 has a radially inner shaft-engaging surface 40 for lying down against and sealingly engaging the shaft 30 in operation. The element 38 has a length along its shaft-engaging surface 40 that is several times the thickness of the element 38. The element 38 may be formed with hydrodynamic grooves or features (not shown) as is well know by those skilled in the art. The PTFE element 38 is backed by a strip 42 of the elastomeric material that preferably extends the full length of the element 38. The element 38 and strip 42 are radially extending so as to form an annular PTFE seal lip 44. The seal lip 44 is spaced axially from the elastomeric lip 32.

The seal body 20 is formed with a flex-enhancing undercut region 46. The undercut region 46 extends from the shaft-engaging side 40 of the PTFE seal element 38 axially toward and overlies the PTFE lip 44. The undercut region also extends across the foot portion 18 of the carrier, such that the PTFE seal lip 44 extends from a hinge region 48 adjacent an opposite air side 50 of the carrier 12 overlying the foot region 18 toward the elastomeric seal lip 32 in the direction of the oil side 22 of the seal assembly. The foot region 18 is preferably covered with the elastomeric material 20 and defines a relatively rigid section 52 of the body 20 separating the hinges 36, 48 of the lips 32, 44, respectively. As such, the hinge 48 of the PTFE lip 44 is separate and isolated from the hinge 36 of the elastomeric lip 32 so as to enable the seal lips 32, 44 to flex independently of one another. It will be seen that the undercut region 46 extends over the substantial length of the PTFE element 38. In other words, the PTFE seal lip 44 is undercut from the free oil-side end of the PTFE seal element 38 substantially, and preferably fully, to the opposite air-side end of the element 38.

The elastomer body 22 may include at least a second elastomeric seal lip 54. The second lip 54 is spaced axially from the PTFE lip 44 on the air-side of the seal axially opposite that of the first elastomeric seal lip 32. The second lip 54 extends in an axially opposite direction as that of the PTFE lip 44.

Obviously, many modifications and variations of the present invention are possible in light of the above teachings. It is, therefore, to be understood that within the scope of the appended claims, the invention may be practiced otherwise than as specifically described.

What is claimed is:

1. A shaft seal assembly for engaging a shaft comprising:
   a rigid annular casing having a generally cylindrical mounting portion and a radially inwardly extending flange portion;
   an elastomer seal body molded to said casing and defining at least one annular elastomer seal lip extending radially inwardly from said casing for sealing engagement with a shaft;
   a PTFE seal element bonded to said elastomer seal body to define a PTFE seal lip in axially spaced relationship to said at least one elastomer seal lip for sealing engagement with the shaft along substantially the full axial length of said PTFE seal element;
   a flex-enhancing undercut region of said elastomer seal body extending from a radially inner shaft-engaging surface of said PTFE seal element to a location overlying said PTFE seal lip, wherein said flex-enhancing undercut region is generally parallel to said inner shaft-engaging surface of said PTFE seal element when said PTFE seal element engages the shaft;
   wherein said flange portion includes an axially extending annular foot portion at a radially inner extent of said flange portion, said foot portion extending axially from said flange portion toward said elastomer seal lip to provide a radially rigid section between said elastomer seal lip and said PTFE seal lip;
   said foot portion is radially spaced from the PTFE seal lip; and
   said undercut region lies radially between said foot portion and said PTFE lip.

2. The assembly of claim 1 wherein said undercut region defines an elastomer hinge of said PTFE seal lip that is isolated from an elastomer hinge of said elastomeric seal lip.

3. The assembly of claim 1 wherein said PTFE seal lip and said at least one elastomer seal lip extend in the same axial direction.

4. The assembly of claim 2 wherein said hinges of said at least one elastomer and PTFE seal lips are located on axially opposite sides of said flange portion of said casing.

5. The assembly of claim 4 wherein said undercut region extends over a substantial length of the PTFE seal element.

6. The assembly of claim 3 wherein said seal body includes at least another seal lip that is formed on the axially opposite side of said PTFE seal lip as that of said at least one elastomer seal lip.

7. The assembly of claim 6 wherein said at least another elastomer seal lip extends in a direction axially opposite that of the PTFE seal lip.

8. The assembly of claim 1 wherein said PTFE seal lip includes an associated elastomer hinge disposed on one axial side of said foot portion and said at least one elastomer seal lip includes an associated elastomer hinge on an axially opposite side of said foot portion.

9. The assembly of claim 1 wherein said PTFE seal element is backed by said elastomer seal body and has a thickness in the axial direction that continually decreases toward a free end of said PTFE seal element.

10. The assembly of claim 2 wherein said radially rigid section extends between and isolates said elastomer hinges from one another.

11. The assembly as set forth in claim 1 wherein said flex-enhancing undercut region axially extends substantially the length of the inner shaft-engaging surface of said PTFE seal element.

12. A shaft seal assembly comprising:
    a rigid annular casing being generally cylindrical and having an axially extending mounting portion, a radially inwardly extending flange portion and an annular foot portion extending axially from said flange portion at a radially inner extent of said flange portion to provide a radially rigid section;
    an elastomer seal body molded to said casing and having at least one annular elastomer seal lip extending radially inwardly from said casing for sealing engagement with a shaft;
    a PTFE seal element bonded to said elastomer seal body and having an inner shaft-engaging surface for engaging said shaft along substantially a full axial length of said PTFE seal element;
    a flex-enhancing undercut region of said elastomer seal body extending axially along the length said PTFE seal element radially outwardly of said PTFE seal lip; and
    the flex-enhancing undercut region lies radially between said annular foot portion and said PTFE seal lip.

* * * * *